US005861077A

United States Patent [19]

Kamijo et al.

[11] Patent Number: 5,861,077

[45] Date of Patent: *Jan. 19, 1999

[54] SEPARATION METHOD FOR ADHESIVE SHEET AND ITS DEVICE

[75] Inventors: Noriyuki Kamijo, Suwa; Kenji Watanabe, Tokyo; Takanobu Kameda, Tokyo; Chieko Aida, Tokyo; Tomoyuki Shimmura, Tokyo, all of Japan

[73] Assignees: Seiko Epson Corporation; King Jim Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 575,929

[22] Filed: Dec. 20, 1995

[30] Foreign Application Priority Data

| | | | |
|---|---|---|---|
| Dec. 21, 1994 | [JP] | Japan | 6-318921 |
| Nov. 29, 1995 | [JP] | Japan | 7-310302 |

[51] Int. Cl.$^6$ ..................... B32B 35/00

[52] U.S. Cl. ..................... 156/344; 156/249; 156/584; 29/426.1

[58] Field of Search ..................... 156/249, 344, 156/584; 29/402.03, 426.1, 426.4, 426.2

[56] References Cited

U.S. PATENT DOCUMENTS

| | | | |
|---|---|---|---|
| 3,028,280 | 4/1962 | Hoffman . | |
| 3,106,324 | 10/1963 | Fritzinger . | |
| 3,266,797 | 8/1966 | Stievenart | 156/584 X |
| 3,292,513 | 12/1966 | Palmer . | |
| 3,314,339 | 4/1967 | Guffy et al. . | |
| 3,533,616 | 10/1970 | Bettenhausen | 83/175 X |
| 3,755,049 | 8/1973 | Leloux | 156/584 |
| 3,777,604 | 12/1973 | Gerber . | |
| 3,951,727 | 4/1976 | Greenberg . | |
| 4,173,510 | 11/1979 | Tobey | 156/584 |
| 4,216,048 | 8/1980 | Gehweiler | 156/344 |
| 4,245,538 | 1/1981 | Kammann et al. . | |
| 4,457,199 | 7/1984 | Corcoran . | |
| 4,494,435 | 1/1985 | Lindsay . | |
| 4,503,744 | 3/1985 | Garner et al. . | |
| 4,512,839 | 4/1985 | Gerber . | |
| 4,732,069 | 3/1988 | Wood et al. . | |
| 4,854,205 | 8/1989 | Anderka . | |
| 4,920,495 | 4/1990 | Pilkington . | |
| 4,934,236 | 6/1990 | Gordon . | |
| 4,940,506 | 7/1990 | Krause | 156/584 |
| 5,160,573 | 11/1992 | Takagi et al. . | |
| 5,254,200 | 10/1993 | Takagi | 156/249 X |
| 5,275,077 | 1/1994 | Kobayashi . | |
| 5,460,681 | 10/1995 | Horner | 156/344 |
| 5,515,758 | 5/1996 | Bechmann . | |
| 5,569,354 | 10/1996 | Day | 156/344 X |
| 5,658,416 | 8/1997 | MacCollum et al. | 156/584 X |

FOREIGN PATENT DOCUMENTS

| | | | |
|---|---|---|---|
| 0188822 | 7/1986 | European Pat. Off. . | |
| 196383 | 10/1986 | European Pat. Off. . | |
| 0231820 | 8/1987 | European Pat. Off. . | |
| 0383157 | 8/1990 | European Pat. Off. . | |
| 0506257 | 9/1992 | European Pat. Off. . | |
| 0607026 | 7/1994 | European Pat. Off. . | |
| 0661142 | 7/1995 | European Pat. Off. . | |
| 56-161161 | 12/1981 | Japan | 156/584 |
| 57-98837 | 6/1982 | Japan . | |
| 5-169749 | 7/1993 | Japan . | |
| 1293024 | 2/1987 | U.S.S.R. . | |
| WO8911806 | 12/1989 | WIPO . | |

*Primary Examiner*—Mark A. Osele
*Attorney, Agent, or Firm*—Loeb & Loeb LLP

[57] ABSTRACT

This invention provides a separation method for an adhesive tape and a separation device that can reliably and efficiently perform the operation of removing the backing sheet from the adhesive sheet of the adhesive tape and can be automated with a simple structure. The adhesive tape comprises a base sheet, an adhesive sheet which is applied to the base sheet and a backing sheet laminated to the base sheet. According to the invention, one end of the adhesive tape is supported leaving that end as a free end. Separation means is used to bend the free end in the direction from a first surface of the adhesive tape to a second surface of the adhesive tape until slippage occurs between the adhesive sheet and backing sheet. While in this state, the separation means is withdrawn from the adhesive tape as it traces the end surface at the free end. Thus, the backing sheet is removed from the adhesive tape and can be affixed to an object.

14 Claims, 8 Drawing Sheets

SEPARATION METHOD FOR ADHESIVE SHEET AND ITS DEVICE

BACKGROUND OF THE INVENTION

1. Field of the Invention

This invention relates to a separation method for an adhesive tape which includes a base tape and a backing sheet laminated on the base tape. The base tape includes a base sheet and an adhesive sheet which is sandwiched between the base sheet and the backing sheet. The backing sheet is separated from the base tape by this method. The invention also relates to a device that separates the backing sheet from the base tape of the adhesive tape.

2. Description of the Related Art

Recently, due to the simplification of the application of tapes and other adhesive tapes to objects, these types of adhesive tapes are being used in various applications. In these cases, characters are imprinted on the surface of the base tape of the adhesive tape which is used as a label. The base tape on which adhesive is applied is affixed to an object after the backing paper is removed from the adhesive tape. Removing the backing paper from the adhesive tape using one's finger is extremely difficult. Various separation methods and devices have been proposed.

A separation method and device was disclosed in Japanese Laid-Open Patent Application 57-98837. In this system, as shown in FIG. 13, base tape 52 as well as adhesive 53 of adhesive tape 50 was cut with a cutter leaving backing paper 51 intact; a so-called half-cut was performed. The user would bend end member 50*a*, as indicated by the imaginary lines in FIG. 13, with his finger, and then using end member 50*a* as a handhold he would separate backing paper 51 from adhesive tape 50 (base tape 52).

In the separation method and device disclosed in Japanese Laid-Open Patent Application 5-169749, the corner of the adhesive tape was sandwiched between a punch and die and the adhesive tape was permanently deformed. In this case, due to the difference in rigidity between the base tape and the backing paper, they did not return to the same shape after being removed from the punch thus separating the backing paper from the adhesive tape. That part was used as a handhold to remove the backing paper from the adhesive sheet.

In the first separation method above, it is necessary to consistently perform the half-cut such that it cuts base tape 52 as well as adhesive 53 to a depth of several microns to several tens of microns and leaves backing paper 51 intact. Thus, it requires a high level of precision in the structure and control of the device. It was also necessary to leave about a 5-mm length at end 50*a* of adhesive tape 50 as a handhold for separation, thus wasting adhesive tape 50.

In the second separation method, the rigidities of the base tape and backing paper and their difference and the adhesion of the adhesive to the backing paper must be considered in setting the contact surface area and the punch depth of the punch and die. Therefore, separation was unreliable and was not satisfactory. Also, since the base tape is permanently deformed together with the backing tape, the tape tends to bend. This results in unevenness in the tape affixed to an object and makes it easier for the tape to come off the object to which it is affixed.

The invention intends to solve these problems. It provides a separation method for adhesive tape and a device with a simple structure to automate the separation. This increases the reliability and efficiency of the operation that separates the backing sheet from adhesive tape.

SUMMARY OF THE INVENTION

Therefore, it is an object of the invention to overcome the above problems.

The invention provides a separation method for an adhesive tape which includes a base tape and a backing sheet laminated on the base tape. The base tape includes a base sheet and an adhesive sheet which is sandwiched between the base sheet and the backing sheet. The separation method separates the backing sheet from the base tape. According to this method, one end of the adhesive tape is supported leaving that end as a free end. Then, the free end is bent with a separation means in a direction from a first surface of the adhesive tape to a second surface of the adhesive tape until slippage occurs between the adhesive sheet and the backing sheet. The first surface is on the outside of the bend and the second surface is on the inside bend. When the slippage occurs, the separation means is withdrawn from the adhesive tape as it traces the end surface at the free end.

In this embodiment, since the free end of the adhesive tape is bent in the direction from the first surface of the adhesive tape to the second surface of the adhesive tape until slippage occurs between the adhesive sheet and the backing sheet, the extensibility or compressibility of the backing sheet overcomes the adhesive force of the adhesive. While the adhesive force of the adhesive on the backing sheet weakens, whichever member of the adhesive sheet and backing sheet has the smaller radius of curvature protrudes slightly. Further, by withdrawing the separation means from the adhesive tape, while in this state, such that it traces the end surface of the free end, the base sheet and backing sheet rebound after time, resulting in the backing sheet separating from the base tape. This forms a handhold at the edge of the adhesive sheet that is used to pull the backing sheet away from the adhesive sheet.

In the separation method above, the base sheet and the backing sheet have different rigidities. The bending operation is performed such that whichever sheet of the base sheet and backing sheet that has the higher rigidity is on the outside of the bend and whichever sheet that has the lower rigidity is on the inside of the bend. The tracing operation is performed by the separation means in the direction from the sheet with higher rigidity toward the sheet with lower rigidity.

According to this embodiment, slippage occurs easily between the layers due to the difference in rigidity between the base sheet and the backing sheet. Since the sheet with the higher rigidity readily returns to its original shape while the member with the lower rigidity does not readily return to its original shape when the base sheet and the backing sheet rebound, re-adhesion between the base tape and the backing sheet is prevented.

According to another embodiment, the base sheet and the backing sheet have different limits of elasticity in the bending of the base sheet and the backing sheet. In this method, one end of the adhesive sheet is supported leaving it as a free end, and the separation means is used to bend the free end in the direction from a first surface of the adhesive tape to a second surface of the adhesive tape until the smaller of the limits of elasticity of the base sheet and the backing sheet is exceeded.

According to this method, bending is performed within the limit of elasticity of whichever sheet of the base sheet and backing sheet that has the larger limit of elasticity. Therefore, this sheet returns to its original shape. However, since bending is performed within the larger limit of elasticity and outside the smaller limit of elasticity, the sheet with the smaller limit of elasticity does not return to its original shape. That is, by bending the adhesive tape, the two sheets, which are attached to each other by adhesive, undergo elastic deformation and permanent deformation and a force results that works against the adhesive force of the adhesive. The force tries to separate them when the adhesive tape returns to its original shape, thus separating the backing sheet from the adhesive sheet on the base sheet. This forms a handhold at the edge of the adhesive tape that is used to pull the backing sheet away from the adhesive tape.

In this separation method, it is desirable that the bending operation be performed such that whichever sheet of the base sheet and the backing sheet that has the higher limit of elasticity is on the outside of the bend and whichever sheet that has the lower limit of elasticity is on the inside of the bend.

In the above embodiment, whichever sheet of the base sheet and the backing sheet that is bent by the separation means and positioned on the outside of the bend undergoes elastic deformation and whichever sheet that is positioned on the inside of the bend undergoes plastic deformation. Therefore, when the bending force is released, the sheet positioned on the outside returns to its original shape and the sheet positioned on the inside does not return to its original shape, thus causing both sheets to relax to an open position centered on the support member. That is, both members stabilize to a completely separate state.

According to another embodiment, the base sheet and the backing sheet have different coefficients of friction on the end surfaces of the base sheet and the backing sheet. According to this method, one end of the adhesive tape is supported leaving that end as a free end. A separation means is used to rub against the end surface on the free end in the direction from one of the base sheet and the backing sheet that has the smaller coefficient of friction toward the sheet that has the higher coefficient of friction.

In this method, by using the separation means to rub against the end surface at the free end of the adhesive tape while applying a consistent compressive force, slippage occurs on the sheet with the lower coefficient of friction and the sheet with the higher coefficient of friction is subjected to the friction. That is, the sheet with the larger coefficient of friction positioned at the opposite side in the direction of rubbing acts against the adhesive force of the adhesive due to this friction, resulting in the separation. This forms a handhold at the edge of the adhesive tape that is used to pull the backing sheet away from the adhesive sheet.

In all of the above methods of the invention, it is desirable that the separation operation be repeated a plurality of times. Thus, even if the backing sheet is not separated from the adhesive sheet by one separation operation, the adhesive strength of the adhesive is gradually weakened by repeating the operation. Therefore, even if there is deviation in the quality of the base sheet or the backing sheet of the adhesive tape, or even if there is deviation in the adhesive strength of the adhesive, the backing sheet can be reliably separated from the adhesive sheet.

In all of the above methods of the invention, it is desirable that the period of repeating the separation operation be longer than one-half the period of the characteristic vibration frequency of the free end of the adhesive tape. In this way, sufficient time can be obtained for the adhesive tape to recover completely after one separation operation, and therefore each separation operation can act fully on the adhesive sheet to more reliably separate the backing sheet from the adhesive tape.

In all of the above methods of the invention, it is desirable that the free end of the adhesive tape be a corner of the adhesive tape.

According to this invention, the rigidity or limit of elasticity of the adhesive tape can be actualized in a state in which the free end is extended to a certain degree. By separating the part where the adhesive strength of the adhesive is excessively weakened toward the edge of the free end, the backing sheet becomes easier to be removed from the adhesive tape.

In all of the above methods of the invention, it is desirable that the protruding length of the free end of the adhesive tape be 5 T to 100 T, where T is the thickness of the free end. In this way, the separation can be performed on any average adhesive tape. Further, a suitable dimension for pulling the backing sheet can be obtained.

The invention also provides a separation device for separating the backing sheet from the adhesive tape. The device comprises a support means that supports one end of the adhesive tape leaving that end as a free end, and a separation means that bends the free end in the front-to-back direction until slippage occurs between the adhesive sheet and the backing sheet. While in this state, the separation means is withdrawn from the adhesive sheet as it traces along the end surface at the free end.

According to the separation device of this invention, by bending the free end of the adhesive sheet in direction from a first surface of the adhesive tape to a second surface of the adhesive tape until slippage occurs between the adhesive sheet and the backing sheet, the extensibility or compressibility of the backing sheet overcomes the adhesive force of the adhesive. While the adhesive force of the adhesive on the backing sheet weakens, whichever one of the adhesive sheet and backing sheet that has the smaller radius of curvature protrudes slightly. Further, by withdrawing the separation means from the adhesive sheet while in this state such that it traces the end surface of the free end, the base sheet and backing sheet rebound after time, resulting in the backing sheet separating from the adhesive on the base sheet. A handhold is formed at the edge of the adhesive sheet that is used to pull the backing sheet away from the adhesive sheet.

According to the separation device of this invention, it is desirable that the base sheet and the backing sheet have different rigidities. The bending operation is performed by the separation means such that whichever sheet of the base sheet and the backing sheet that has the higher rigidity is on the outside of the bend and whichever sheet that has the lower rigidity is on the inside of the bend. The tracing operation is performed in the direction from the sheet with the higher rigidity toward the sheet with the lower rigidity.

According to the separation device of this invention, slippage occurs easily between the layers due to the difference in rigidity between the base sheet and the backing sheet. Since the sheet with the greater rigidity readily returns to its original shape while the sheet with the lower rigidity does not readily return to its original shape when the base sheet and the backing sheet rebound, re-adhesion between the base sheet and the backing sheet is prevented.

According to a variation of the invention, the separation means bends the free end in the direction from the first surface of the adhesive tape to the second surface of the adhesive tape until the smaller of the limits of elasticity of the base sheet and the backing sheet is exceeded. In this variation, bending is performed within the larger limit of elasticity of whichever sheet of the base sheet and adhesive sheet. Therefore, this member returns to its original shape.

However, since bending is performed within the larger limit of elasticity and outside the smaller limit of elasticity of the two sheets, the sheet with the smaller limit of elasticity does not return to its original shape. That is, by bending the adhesive sheet, the two sheets, which are attached to each other by adhesive, undergo elastic deformation and permanent deformation. There is a force that works against the adhesive force of the adhesive and tries to separate them when the adhesive sheet returns to its original shape, thus separating the backing sheet from the adhesive of the base sheet. A handhold is formed at the edge of the adhesive sheet that is used to pull the backing sheet away from the adhesive sheet.

According to the separation device of this invention, it is desirable that the bending operation be performed such that whichever sheet of the base sheet and the backing sheet that has the higher limit of elasticity is on the outside of the bend and whichever sheet that has the lower limit of elasticity is on the inside of the bend.

Thus, whichever sheet of the base sheet and the backing sheet bent by the separation means that is positioned on the outside of the bend undergoes elastic deformation and whichever sheet that is positioned on the inside of the bend undergoes plastic deformation. Therefore, when the bending force is released, the sheet positioned on the outside returns to its original shape and the sheet positioned on the inside does not return to its original shape, thus causing both sheets to relax to an open position centered on the support sheet. That is, both sheets stabilize to a complete separate state.

According to the separation device of the invention, it is desirable that the separation means of the separation device includes a separation sheet that comes in contact with the free end of the adhesive sheet and an actuating mechanism that causes the separation member to perform the separation operation. By causing the separation member to perform the separation operation, formation of the handhold for removing the backing sheet from the adhesive sheet can be automated. It is also desirable that the part of the separation member that comes in direct contact with the free end of the adhesive sheet be made from rubber.

According to the separation device of this invention, since slippage does not readily occur between the separation member and the adhesive sheet, the adhesive sheet can be sufficiently and consistently bent. When the separation member traces the end surface of the free end, it can cause friction to reliably act on the end surface of the base sheet and the end surface of the backing sheet without slipping.

The actuating mechanism can be rotated to cause the separation member to perform the separation operation. Thus, the separation member performs the separation operation consistently using a simple structure.

According to the separation device of the invention, it is desirable that the separation member include a plurality of protrusions around its circumference, each of which performs the separation operation as the separation member rotates. Thus, even if the rotation speed of the separation member is slow, it can perform the separation operation quickly. Also, the separation member can perform the separation operation a plurality of times in one rotation.

In the separation device of the invention, the actuating mechanism may be moved linearly to cause the separation member to perform the separation operation.

In the separation device of the invention, it is desirable that the separation means also include a controller for adjusting the number of times the separation member performs the separation operation via the actuator mechanism. By properly adjusting the number of times the separation operation is repeated, it is possible to reliably separate the backing sheet from the adhesive sheet even when various types of adhesive tapes with varying degrees of difficulty in separation are used.

According to the separation device of the invention, it is desirable that the period of repeating the separation operation over a plurality of times is longer than one-half the period of the characteristic vibration frequency of the free end of the adhesive sheet. Thus, sufficient time can be obtained for the adhesive sheet to recover completely after one separation operation. Therefore, each separation operation can act fully on the adhesive sheet to more reliably separate the backing sheet from the adhesive sheet.

According to the separation device of this invention, it is desirable that the free end of the adhesive tape be a corner of the adhesive tape.

According to the separation device of this invention, the rigidity or limit of elasticity of the adhesive sheet can be actualized in a state in which the free end is extended to a certain degree. By separating the part where the adhesive strength of the adhesive is excessively weakened toward the edge of the free end, the backing sheet becomes easier to remove from the adhesive sheet.

In this invention, it is desirable that the protruding length of the free end of the adhesive tape be 5 T to 100 T where T is the thickness of the free end.

The invention can be used for any average adhesive tape. Further, the separation part that becomes the handhold for pulling the backing sheet can be made a suitable dimension for grabbing.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a perspective view of a tape printer in which a separation device of an embodiment of the invention is built-in.

DESCRIPTION OF THE PREFERRED EMBODIMENTS

Figure 1:
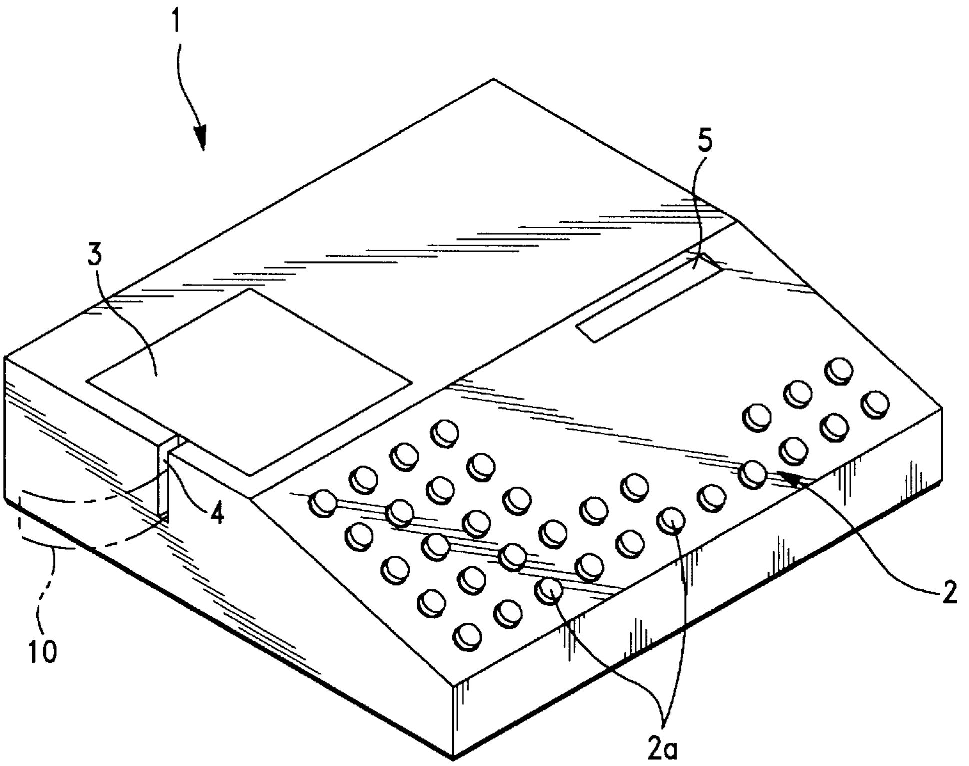

In the drawings, like reference numerals refer to like elements.

First Embodiment

Figure 2:
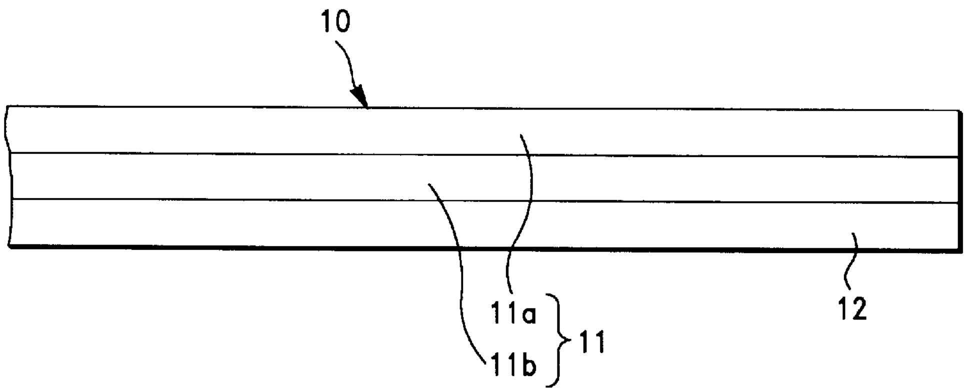
FIG. 2 is an enlarged side view showing the laminated structure of the adhesive tape.
Figure 3:
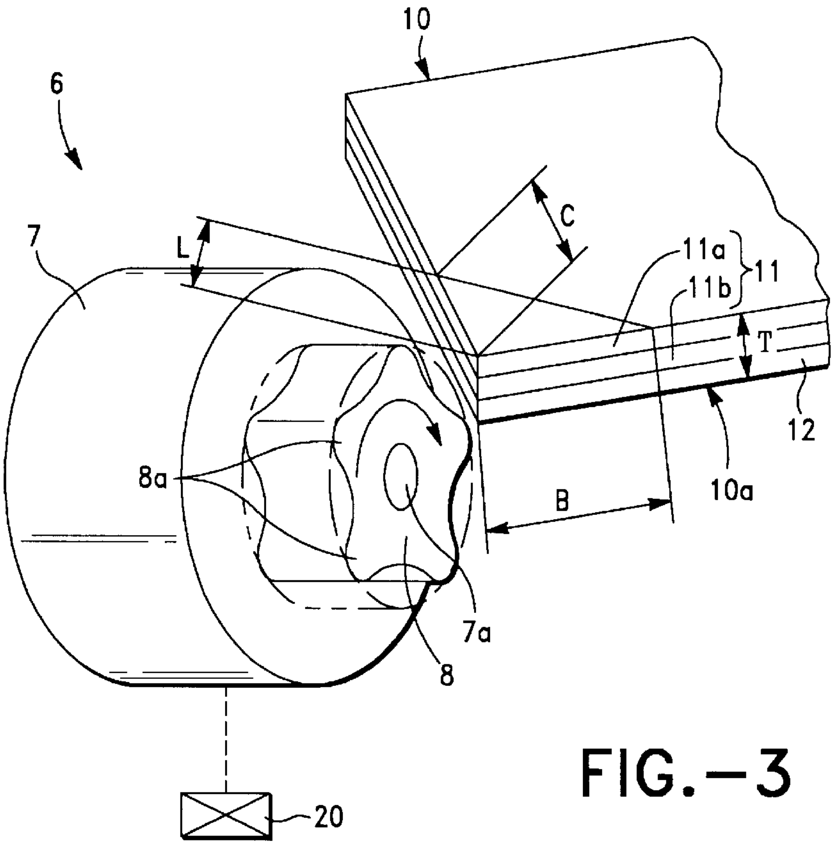
FIG. 3 is a perspective view of the separation device of the first embodiment.
Figure 4:
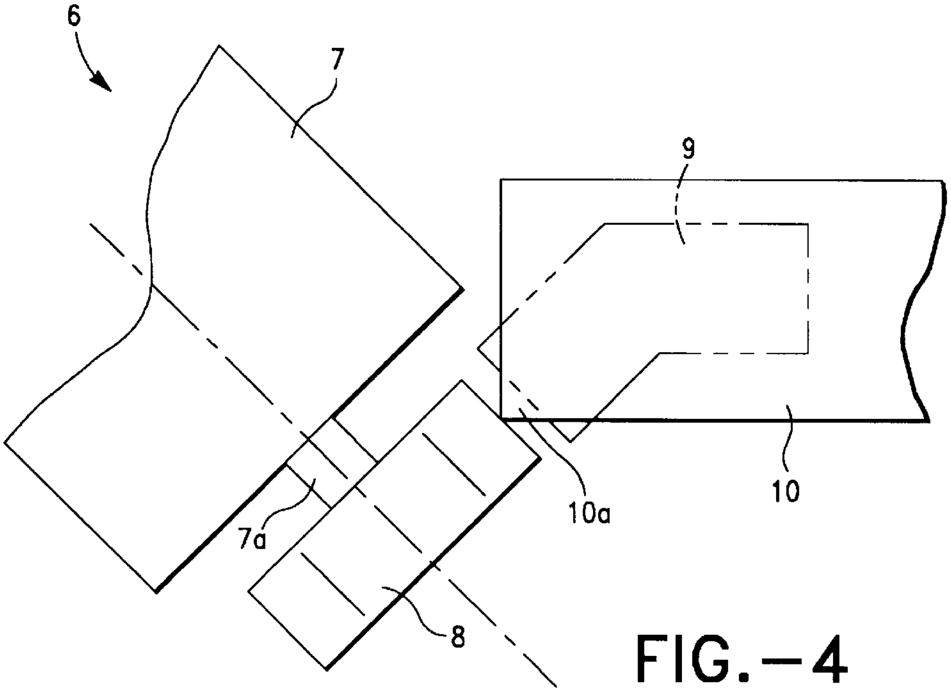
FIG. 4 is a plan view of the separation device of the first embodiment.
Figure 5:
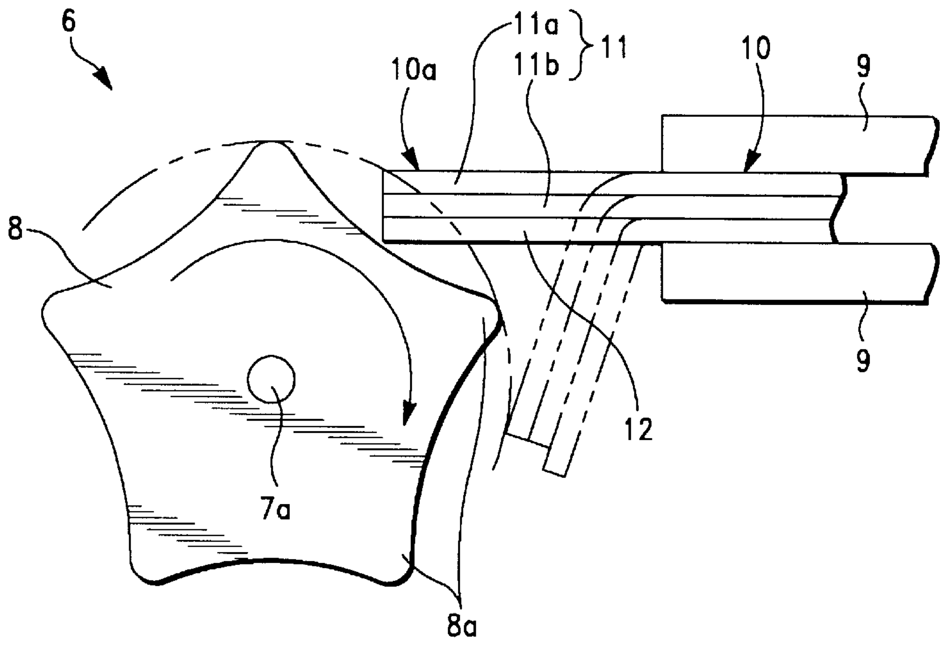
FIG. 5 is a side view showing the separation operation of the separation device of the first embodiment.
Figure 6:
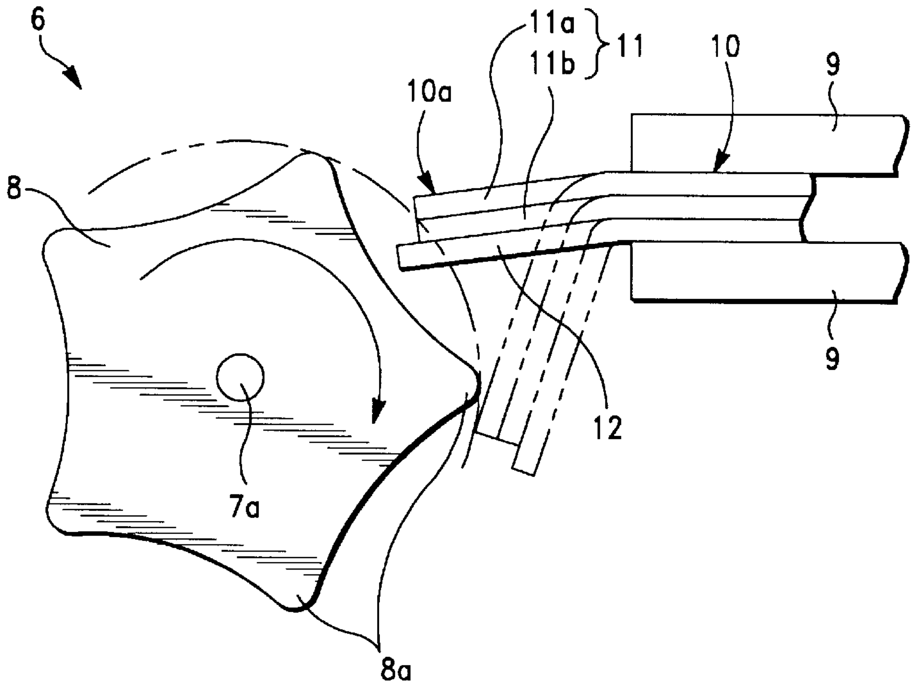
FIG. 6 is a side view showing the separation operation of the separation device of the first embodiment.
Figure 7:
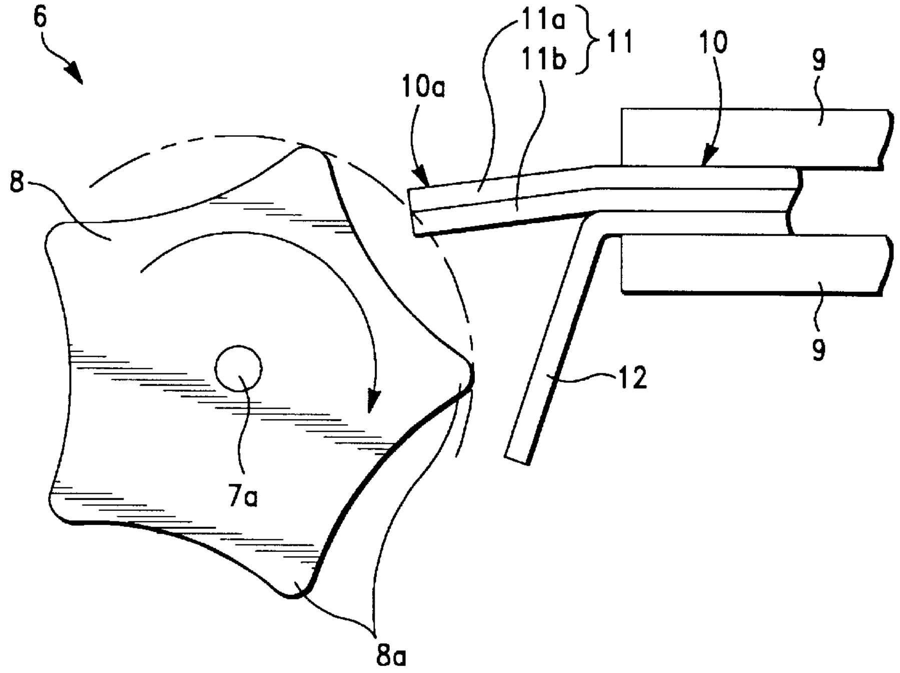
FIG. 7 is a side view showing the separation operation of the separation device of the first embodiment.

The first embodiment of the invention is explained in detail with reference to FIGS. 1–7. FIG. 1 is a perspective view of the tape printing device to which the separation method and separation device for adhesive tape of this invention is applied; FIG. 2 is an enlarged view showing the cut end of the adhesive tape (adhesive sheet) with a backing sheet after being printed in the tape printer; and FIGS. 3 and 4 are a perspective view and plan view, respectively, of the separation device. Also, FIGS. 5, 6 and 7 are side views of the separation device for explaining the separation operation.

As shown in FIG. 1, tape printer 1 includes keyboard 2 with many keys 2*a* on the front part and an access lid 3 toward the back. Also, under lid 3, tape printer 1 contains a tape cartridge, printing mechanism, etc. (none of which are shown). On the side of tape printer 1 is a tape eject opening 4 from which adhesive tape 10 is ejected after printing, and on the front is a tape insertion opening 5 which is linked to the separation device built into tape printer 1.

The user opens access lid 3 and loads a tape cartridge on which is wound a fresh adhesive tape 10 of a desired width, after which the user enters the necessary characters by depressing keys 2*a* on keyboard 2. The characters are then printed by thermal transfer, etc., on above adhesive tape 10 being fed at a fixed speed. When the printing is completed, the feeding of adhesive tape 10 is stopped. At this time, the printed part of adhesive tape 10 is ejected from tape eject opening 4, and the user operates a cutter, not shown, by a manual or automatic operation to cut the ejected part of adhesive tape 10.

This cut adhesive tape 10 is adhesive tape 10 with backing paper, and below is a detailed explanation of the separation method and separation device for this adhesive tape 10. However, in order to facilitate understanding of the invention, the explanation will begin with the structure of adhesive tape 10 with backing paper.

As shown in FIG. 2, adhesive tape 10 comprises a base tape (base sheet) 11, which includes adhesive 11*b* applied to base material 11*a*, and a backing paper (backing sheet) 12 to which base tape 11 is affixed by adhesive 11*b*. Base material 11*a* is made from commonly known polyvinyl chloride resin, polypropylene resin, etc. Backing paper 12 is made from regular paper, etc. The above printing is performed on the surface of base material 11*a*. After printing, base tape 11 is applied to a selected object after removing backing paper 12 from adhesive tape 10. Therefore, backing paper 12 is there to prevent dirt, etc., from adhering to adhesive 11*b* until adhesive tape 10 is to be used and can be removed from base tape 11 relatively easily. Backing paper 12 is treated with silicon, etc., and the adhesive force of adhesive 11*b* is very much smaller than its adhesive force on base material 11*a*.

When adhesive tape 10 having such a structure is inserted in above tape insertion opening 5 with base material 11*a* being printed with characters, a sensor or switch (not shown) detects insertion of adhesive tape 10 and the separation device is activated. This separates backing paper 12 from adhesive tape 10 at one corner at the front end of adhesive tape 10. After removing adhesive tape 10 from tape insertion opening 5, the user completely removes backing paper 12 from adhesive tape 10 using the part where backing paper 12 is separated from the corner as a hand hold and applies it to a selected object.

As shown in FIG. 3, separation device 6 comprises motor (actuator mechanism) 7, separation member 8 attached to output shaft 7*a* of motor 7, and an upper and lower pair of support members 9,9 (see FIG. 5) which support adhesive tape 10 leaving a free end (corner) 10*a*. In this case, it is desirable that motor 7 have a single-unit structure with a reduction gear to make it possible to rotate separation member 8 at low speed. Separation member 8 is roughly a star-shaped rotating body with protrusions 8*a* in five locations around its circumference, and its outer member is made from silicon rubber, etc. Separation member 8 may be a roller shape as shown by the imaginary outline, or it may be gear shaped. The protrusion may be cam shaped at only one location, or plates may be disposed such that they radiate out from output shaft 7*a*.

The upper and lower pair of support members 9,9 also serves as an insertion path for adhesive tape 10 linked to above tape insertion opening 5 and is disposed such that inserted adhesive tape 10 is sandwiched in between them. In this case, it is desirable that the gap between the pair of support members 10 become narrow from tape insertion opening 5 toward the back until it becomes nearly the thickness of adhesive tape 10 at the end. Inserted adhesive tape 10 is located by stopping against a stopper (not shown). The locating position is described in detail later.

When adhesive tape 10 is completely inserted in tape insertion opening 5 in the above embodiment, adhesive tape 10 comes close to separation member 8 as shown in FIG. 3 and is finally positioned as indicated by the solid lines in FIG. 5. That is, one corner of the end of adhesive tape 10 moves inside the rotation of separation member 8 so that it can come in contact with separation member 8.

At this point, it is most desirable that adhesive tape 10 be supported by the pair of support members 9,9 such that the corner of adhesive tape 10 with total thickness T becomes a triangular cantilever free end 10*a* whose dimensions on two sides are B and C, as shown in FIG. 3. However, since the force applied to adhesive tape 10 in the separation operation described below is not that large, support members 9,9 may support adhesive tape 10 with a weak spring force capable of withstanding the force applied to it during the separation operation. The support members may support adhesive tape 10 with a small gap between them and adhesive tape 10.

When separation member 8 rotates in the direction of the arrow, free end 10*a* of adhesive tape 10 is bent as shown by the imaginary lines in FIG. 5 such that it takes on a curve shape (bent shape) with base tape 11 on the outside and backing paper 12 on the inside. Since base tape 11 has prescribed thickness T, slippage, or more specifically slippage equivalent to the thickness occurs between adhesive 11*b* and backing paper 12. This is due to the difference in the circumferential length resulting from the difference in the bend radius (bend R) of backing paper 12 positioned on the inside (lower side) and the bend R of base tape 11 positioned on the outside (upper side). As shown in FIG. 5, this causes the end of backing paper 12 to protrude slightly compared to the end of base tape 11. This phenomenon progresses gradually with the bending operation. However, since the amount of protrusion by backing paper 12 due to slippage becomes large as the ratio of the inside bend R to the outside bend R becomes large, it is desirable that the back surface of backing paper 12 on the inside bend have R=0 (zero). This can be achieved by bringing the end of separation member 8 closer to the end of support member 9.

In this longitudinal slippage between both members 11, 12 which occurs when they are bent, the adhesive force of adhesive 11*b* of base tape 11 on the backing paper 12 is considerably weakened from the initial condition, thus making backing paper 12 easier to remove than before the bending operation.

In the process in which bending by separation member 8 progresses, separation member 8 rubs against the end surface (left edge indicated by perpendicular line in FIG. 5) of free end 10*a* and then separation member 8 withdraws from adhesive tape 10. This rubbing operation (friction) also causes backing paper 12 to be separated more easily from base tape 11. Finally, the protruding part of backing paper 12 catches on separation member 8, thus separating backing paper 12 from adhesive tape 10 (see FIG. 7). Of course, if the adhesive strength of adhesive 11*b* is strong, backing paper 12 may not be separated in only one separation operation.

In this case, after contact with one protrusion 8*a* formed on the outer circumference of separation member 8 ends, separation member 8 continues to rotate in the same direction. If contact with protrusion 8*a* was missed, adhesive tape 10 instantaneously recovers to its original state with impact because of its own elastic force. Also, adhesive tape 10 which has returned to its original state is positioned opposite to the depression on separation member 8 in a non-contact state (see FIG. 6).

This recovery of adhesive tape 10 to its original state occurs because the deformation due to bending is roughly within the elastic deformation of at least one of either base tape 11 and backing paper 12 which constitute adhesive tape 10. In this embodiment, base material 11*a* is made from resin and backing paper 12 is made from regular paper. Therefore, base tape 11 has greater rigidity and a larger limit of elasticity than backing paper 12. Since the allowable bending stress is large, the recovery force of base tape 11 contributes the most to the recovery operation.

The completed recovery state of adhesive tape 10 is shown in FIG. 6. As shown in the same figure, adhesive tape 10 which has completed recovery returns to a state slightly bent from its initial state. This indicates that the rigidity of base tape 11 which constitutes adhesive 10 is large and the bend is within the limit of elasticity of base tape 11. It also indicates that the rigidity of backing paper 12 is small and the bend exceeds the limit of elasticity of backing paper 12. It may be concluded therefore that the greater the difference in rigidity between base tape 11 and backing paper 12, the easier separation becomes. Moreover, after separation base tape 11 returns completely to its initial state, backing paper 12 remains bent and does not return to its original state.

Thus, in a case in which the rigidity of base tape 11 is greater than the rigidity of backing paper 12, base tape 11 instantaneously returns to its original position when contact with separation member 8 is released, but backing paper 12 remains in a roughly permanently bent state and does not recover or recovers little, thus resulting in a fixed bend condition.

Due to the instantaneous recovery by base tape 11 and the adhesive force of adhesive 11*b*, backing paper 12 will recover some. However, as described above, recovery by backing paper 12 is not spontaneous and the bent condition of backing paper 12 resists the recovery force from base tape 11. This causes adhesive tape 10 to not completely recover and recovery to a slightly bent state. In other words, adhesive 11*b* acts between base tape 11 and backing paper 12 to cause a reactive pulling state. This results in strengthening the tendency of backing paper 12 to separate from base tape 11.

Next, when free end 10*a* of adhesive tape 10 comes in contact with protrusion 8*a* of separation member 8 again, the end of backing paper 12 protrudes even more than after the first operation. The bending operation further weakens the adhesive force between adhesive 11*b* and backing paper 12. Therefore, when separation member 8 rubs the end surface of adhesive tape 10, it catches on backing paper 12 which is then easily separated from base tape 11 (see FIG. 7). Of course, since there is deviation in the adhesive force of base tape 11 on backing paper 12, it is desirable to repeat the separation operation several times to ensure complete separation.

It is desirable to be able to set the number of repetitions by means of controller 20 connected to motor 7. That is, since the easy of separation of backing paper 12 varies with different kinds of adhesive tape 10, it is desirable to be able to set the number of repetitions to match the adhesive tape 10 being used in tape printer 1. By doing this, separation device 6 can be made one device, thus facilitating its general use.

The time from when the user inserts adhesive tape 10 in tape insertion opening 5 to perform separation until separation is complete is only 1 to several seconds even if the separation operation is performed several times. Following this, the user removes adhesive tape 10 from insertion opening 5, holds backing paper 12 at the separated corner in his fingers, and completely removes backing paper 12 from adhesive tape 10 by pulling in the lengthwise direction of base tape 11. By this means, the separation operation that was previously performed by taking the time to make a handhold with your fingers can now be done efficiently in an extremely short amount of time.

Since this embodiment uses a simpler structure than the action and device of the half-cut system described in the prior art example and does not require a high level of precision, it is more cost effective. Also, since the shape after completion of separation shown in FIG. 7 is hardly permanently deformed because bending is performed in the elastic deformation range of base tape 11, this deformation is hardly noticeable even when a printed base tape 11 is applied to an object.

Particularly when a triangular free end 10*a* is supported as a cantilever in a fixed amount as described above, an equal stress beam is achieved. Therefore, the amount of permanent deformation is small and the recovery force is large. Further, since the amount of deformation is small, the deformation of adhesive tape (base tape 11) 10 that was seen in the prior art after application tends to gradually return to its original state. Therefore, adhesive tape 10 does not separate from objects to which it is applied, thus making it highly reliable and easy to handle.

As described above, by effectively utilizing the difference in the rigidity of base tape 11 and the rigidity of backing paper 12, the difference in the limit of elasticity of both members 11, 12, the rubbing action of separation member 8 on the end surface of free end 10*a*, the slippage between both members 11, 12 caused by bending, the action of instantaneous withdrawal of separation member 8 from adhesive tape 10, the action of separation member 8 to prevent recovery of backing paper 12, and the overall effectiveness of executing these separation operations multiple times, it is possible to efficiently separate backing paper 12 and markedly improve reliability.

In this embodiment, the difference in the rigidity of base tape 11 and backing paper 12 is utilized for one action. Therefore, a method and structure that can greatly utilize the difference in rigidity is desirable. For this reason, it is desirable to use the corner of adhesive tape 10 as described above.

As shown in FIG. 3, the corner is used. Assuming the part indicated by the imaginary line is supported, the maximum stress when bent occurs at the position indicated by the imaginary line. The bending moment at this time is the product of multiplying the stress generated by bending by the length L of the perpendicular line from the tip of the corner to the imaginary line. The length of the imaginary line can be made longer with respect to this length L.

The width of free end 10*a* does affect the stress generated in bending. However, when the corner is used as free end 10*a* and is bent, the stress generated is not as great as when the width is uniform because the width of free end 10*a* gradually decreases from the imaginary line part toward the tip of the corner.

Based on this information, the bending stress of the corner can be kept within the limit of elasticity with no permanent deformation at nearly an equivalent stress. Therefore, as contact with separation member 8 is released, base tape 11 can instantaneously recover to the initial position. This support mode is the same for backing paper 12. However, as described above, since backing paper 12 is made from regular paper, its rigidity is small, and therefore its recovery action is small, thus facilitating efficient separation as described above.

In this embodiment, since the presence of a difference in the respective rigidities of base tape 11 and backing paper 12 is utilized as one means, the rigidity of base tape 11 need not necessarily be larger, and the rigidity of backing paper 12 can be made larger than the rigidity of base tape 11 to achieve the same effect. Even in this case, separation member 8 is moved such that it travels from the member with the higher rigidity toward the other member. Therefore, a structure should be used that bends the member with the greater elasticity toward the member with the smaller elasticity.

Also, as described above, after separation member 8 bends adhesive tape 10, the bending is suddenly released. However, it is necessary to anticipate the time it takes adhesive tape 10 to recover in the interval from which this bending is released until the next bending operation is started. More specifically, it is necessary that this period of repetition be longer than one-half the period of the characteristic vibration frequency of free end 10*a* of adhesive sheet 10. In order to achieve this, the rotation speed of separation member 8 is set.

By doing this, backing paper 12 can be prevented from recovering by being pulled by base tape 11, thus contributing greatly to the separation action. If this is not done and the bending operation is started again before base tape 11 can completely recover, each of the above effects is lost and the timing of recovery of backing paper 12 tends to become the same as recovery of base tape 11. For this reason, it is best not to rotate separation member 8 too fast, and it is desirable to employ a reduction gear on motor 8.

Even if various types of vibration generating means act on adhesive tape 10 in place of separation member 8, the same effect as in this embodiment can be expected. Also, since rotating by hand would not generally be faster than by motor 7, with some practice, the separation effect can be enhanced by operating separation member 8 by hand.

The corner used as free end 10*a* need not be an isosceles triangle, and therefore dimensions B and C noted above need not be the same. Further, a corner need not necessarily be used, and even if the edge of adhesive tape 10 is nearly parallel to the imaginary line that indicates the position of support member 9, the same effect as in this embodiment can be expected under the various conditions noted in this specification. Similarly, the separation operation may be performed using the side of adhesive tape 10 as free end 10*a*. In this method, the separation length (lengths indicated by B and C in FIG. 3) that can be separated can be made longer while the separation interval can be made larger. Also, separation member 8 of this embodiment need not be operated by motor 7, but rather the same effect as in this embodiment can be obtained by using a handle or other means that can be operated by hand.

Second Embodiment

Figure 8:
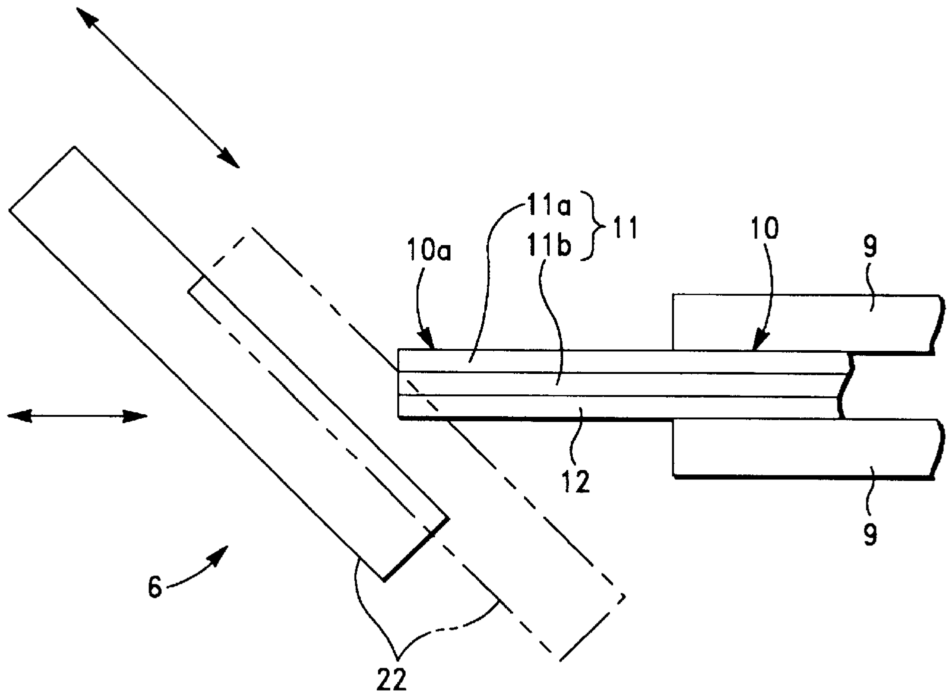
FIG. 8 is a side view of the separation device of the second embodiment.

The second embodiment of the invention is explained with reference to FIG. 8. FIG. 8 shows a structure wherein adhesive tape 10 with backing paper 12 is held by support members 9,9 as in the first embodiment. Moving member (separation member) 22 capable of moving linearly along the tape is moved horizontally to the right as indicated by the arrow while also being moved down and to the right as indicated by the other arrow. Though not shown, this moving member 22 is moved as required by a motor and linking mechanism.

In this manner, moving member 22 deforms mainly backing paper 12. Due to the elasticity of base tape (with adhesive 11*b*) 11, it is accompanied by an action that tries to stay at the position of the solid lines, while only backing sheet 12 reaches the area of permanent deformation as in the first embodiment.

Separation may be completed by one of these operations. However, if it is not completed, base tape 11 is deformed together with backing paper 12 and slippage occurs between the two in the longitudinal direction whereby the separation operation is furthered. Since base tape 11 is deformed in the elastic deformation range, a recovery force acts on base tape 11.

When moving member 22 is suddenly moved horizontally to the left after its downward movement to the right has stopped, the bending of base tape 11 is instantaneously released as in the first embodiment and base tape 11 tries to recover instantaneously to the solid line state. However, since backing paper 12 is deformed to a roughly permanently deformed state, it is pulled to a dependent recovered state by the recovery force of base tape 11, which action either significantly lowers the adhesive force between base tape 11 and backing paper 12 or separates backing paper 12 at this stage.

As described above, contact with base tape 11 is released when moving member 22 moves instantaneously. In order to prevent backing paper 12 from recovering; i.e., in order to make the coefficient of friction large, a fine jagged surface should be formed on moving member 22. This jagged surface does not have to be extreme; i.e., about one-half the thickness of adhesive tape 10 will have sufficient effect. Also, by repeating this operation multiple times, both members 11, 12 can be completely separated.

In this embodiment, it was noted that moving member 22 is moved horizontally and diagonally, but the embodiment is not limited to this in that moving member 22 may be moved vertically to bend adhesive tape 10 or any other structure is possible as long as it traces the edge and then moves away from it.

Further, as in the first embodiment, by using moving member 22 with multiple large protrusions 8*a*, a system is configured in which bending and release (separation operation) are repeated multiple times during movement in one direction (e.g., down and to the right as described above), thus further improving operation. Also, in order to effectively cause bending, it is desirable that moving member 22 be made from metal, plastic or other high friction rubber material with a large frictional force. Of course, moving member 22 may be automatically moved with a motor, etc., or moved manually.

Third Embodiment

Figure 9:
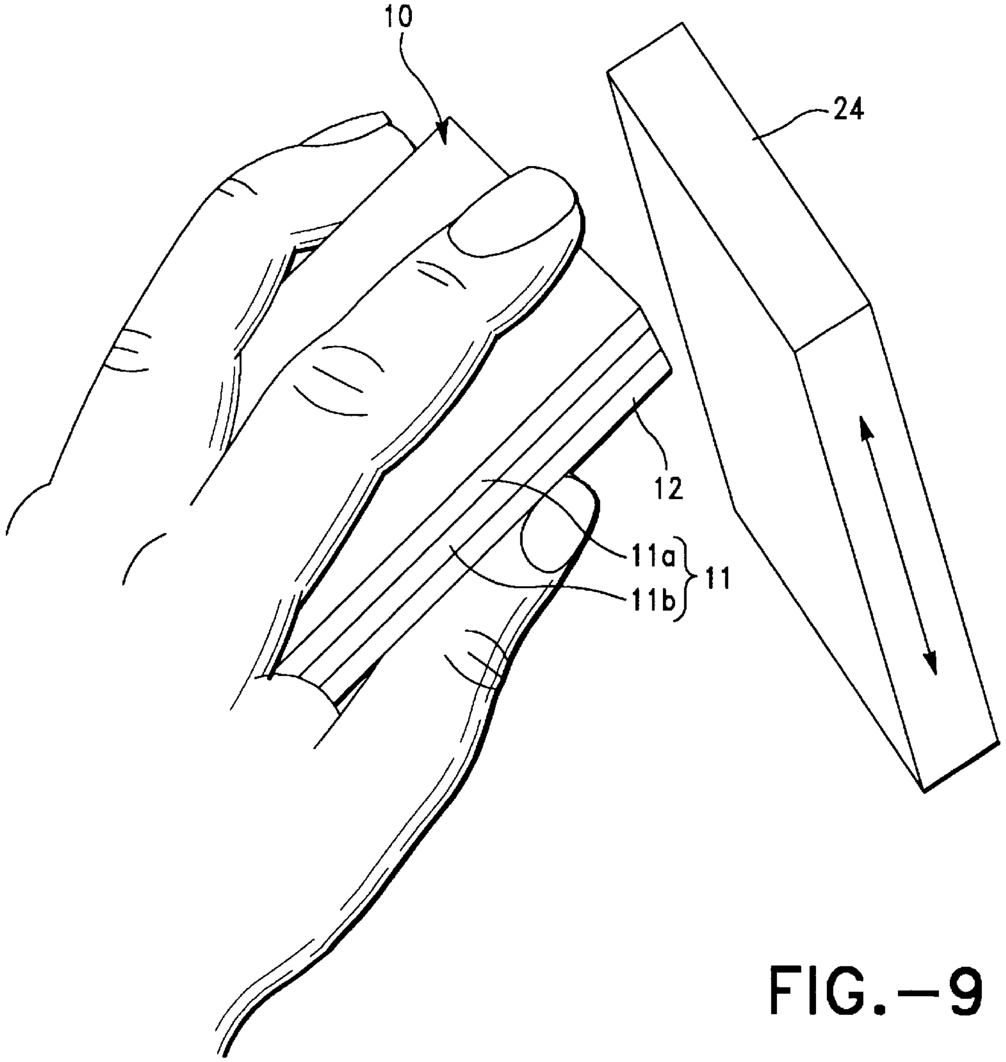
FIG. 9 is a perspective view of the separation device of the third embodiment.

The third embodiment is explained with reference to FIG. 9. The third embodiment shows a manual separation method. In the figure, 10 indicates adhesive tape with paper backing 12, and 24 is the moving member. It is desirable that moving member 24 be made from a material that demonstrates a high friction on adhesive tape 10. As described above, it is desirable that a fine jagged surface be formed on it.

In this case, moving member 24 is held in the right hand and adhesive tape 10 is held between the thumb and index finger of the left hand such that a triangle is formed whose dimensions on two sides are respectively B=0.5–10 mm and C=0.5–10 mm (B need not equal C) as shown in FIG. 3. Of base tape 11 and backing paper 12 which make up adhesive tape 10, if the side with the higher elasticity is held against the index finger, then adhesive tape 10 is bent by moving member 24 from the index finger side toward the thumb side (down direction).

In this way, separation is achieved by generating slippage between each member of adhesive tape 10, weakening the adhesive force, furthering separation by the elasticity action during recovery and other actions described above. This system is ideal as a low-cost manual method.

Fourth Embodiment

The fourth embodiment is explained with reference to FIG. 10. In the figure, 30 is a plate-shaped member having a radius at the end and jagged surface 33, and 31 is a plate-shaped member like 30 but does not necessarily have a jagged surface. These two plate-shaped members 30, 31 are linked so that they can rotate on hinge 32, and opposing blades are affixed at the radius of each of plate-shaped members 30, 31. By holding plate-shaped members 30, 31 and rotating each of plate-shaped members 30, 31 in the P and Q directions, respectively, the corner of adhesive tape 10 can be cut to form a radius.

That is, a spring not shown in the figure is disposed between plate-shaped members 30, 31 and keeps these radii continually separated. The user first holds adhesive tape 10 with backing paper in one hand and holds these plate-shaped members 30, 31 in the other hand. He then sandwiches the corner of adhesive 10 between these plate-shaped members 30, 31 and cuts the corner as if cutting a fingernail.

Forming the corner of adhesive tape 10 into a radius or beveling the corners straight by the same method may be considered to be just normal trimming, but by doing this, adhesive tape 10 can be given a more label-like appearance.

By providing jagged surface 33 on plate-shaped member 30 of the fingernail cutter-like trimming tool configured in this way, the trimming tool can also serve as moving member (separation member) 24 of the third embodiment.

Figure 10:
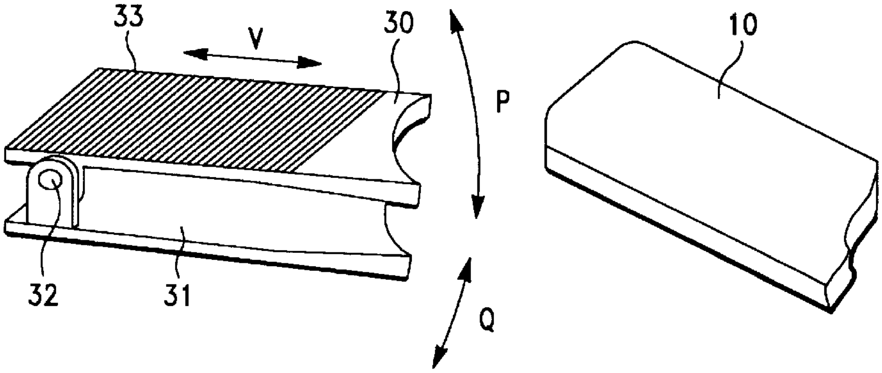
FIG. 10 is a perspective view of the separation device of the fourth embodiment.

Adhesive tape 10 that has been trimmed is shown in FIG. 10. The same separation operation as in the third embodiment can be performed by holding trimmed adhesive tape 10 in your hand to form a triangular free end whose dimensions on two sides are B=0.5–10 mm and C=0.5–10 mm as described above and then bringing jagged surface 33 of plate-shaped member 30 in contact with the corner of adhesive tape 10 formed into a radius and moving it in the direction of the V arrow. By this means, as in the third embodiment, the separation operation of bending and releasing is performed on each component member of adhesive tape 10.

Since this embodiment uses a structure in which the separation member is built into the trimming tool for adhesive tape 10, there is no need to pick up separate tools for trimming and separation, and since the trimming and separation operations can be performed one after the other, it is convenient and it is low cost.

This is not limited to a manually operated tool and can be applied to an automatic device. In this case, if the same motor is used for separation and trimming, the structure of tape printer 1 can be simplified, and the device can be made compact, thin and at low cost.

Fifth Embodiment

The state in which adhesive tape 10 is held is a major factor in the system and structure capable of efficiently achieving the effect of this embodiment. In the case shown in FIG. 3 in which the thickness of adhesive tape 10 is T, the dimensions on two sides of the triangle should be a combination of B=5 T–100 T and C=5 T–100 T.

This is because even if separation is performed below this range, the user cannot recognize the separated part, or it is difficult to grab and pull with his fingers. If this range is exceeded, however, the bend stress of base tape 11 becomes large, thus nearing permanent deformation and weakening the recovery force, which lowers the effectiveness of the separation action.

The separation action of this embodiment utilizes the rigidity of each of the component members of adhesive tape 10, and therefore the thickness T and support length (length of free end) have much influence. Since the thickness of adhesive tape 10 is normally about 0.1–0.3 mm, when these are inserted in the above formula, the dimensions on two sides of the triangle shown in FIG. 3 are respectively B=0.5–30 mm and C=0.5–30 mm.

Since this method and structure, which separate by supporting a corner whose end is a cantilever of the above-mentioned length in a free state and bending and releasing this part by the above-mentioned means, is a system that causes elastic deformation in at least one of the component members of adhesive tape 10 and permanent deformation in the other, when the corner is supported as described above, maximum stress is generated during bending in the part indicated by the imaginary line. Since the stress generated in each part with respect to the size of the bending moment can be made small due to the relationship between the length L of the vertical line from the tip of the corner in contact with separation member 8 to the imaginary line in the first embodiment and the beam width of free end 10*a*, it is possible to set one of the above materials within the range of elastic deformation, the contact surface area and adhesive strength between adhesive 11*b* and backing paper 12 are both small at the corner, and a handhold for separating is formed at the corner by the resistance to cutting when adhesive tape 10 is cut. Therefore, separation at the corner can be performed most efficiently when processed by the methods and structures described in each embodiment of the invention under the conditions for easiest separation.

Figure 11:
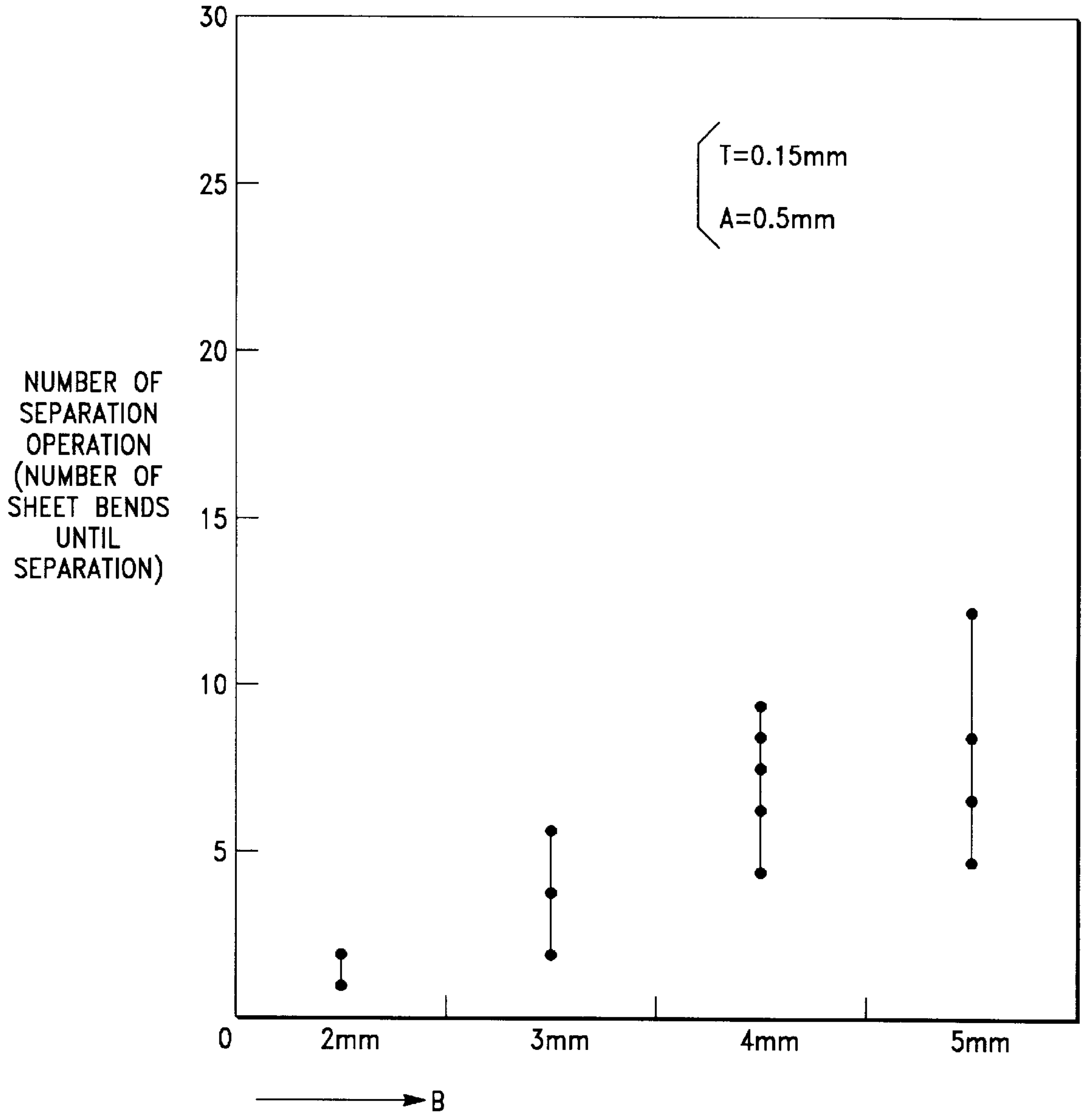
FIG. 11 is a graph showing the experimental results of the fifth embodiment.
Figure 12:
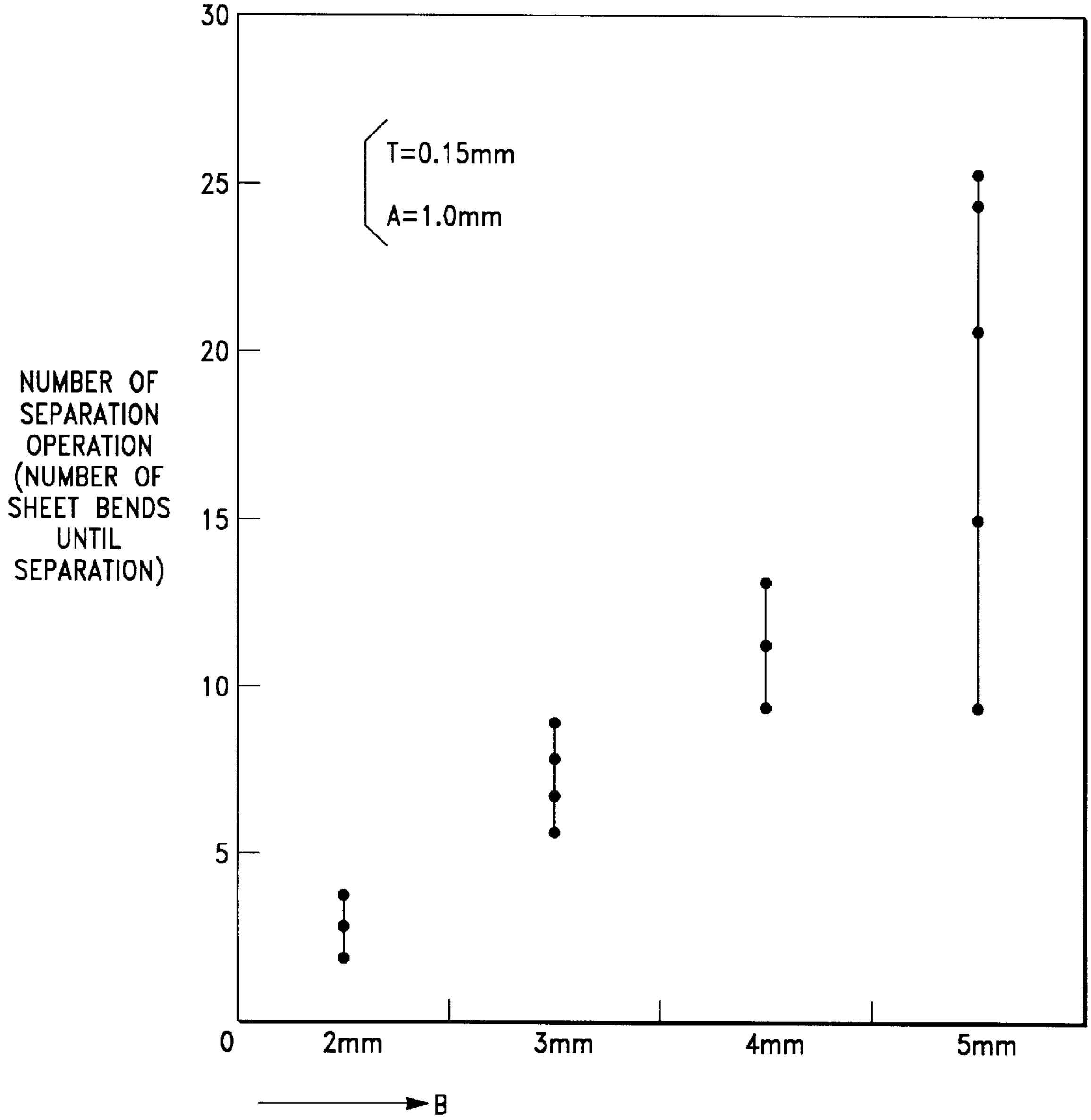
FIG. 12 is a graph showing the experimental results of the fifth embodiment.
Figure 13:
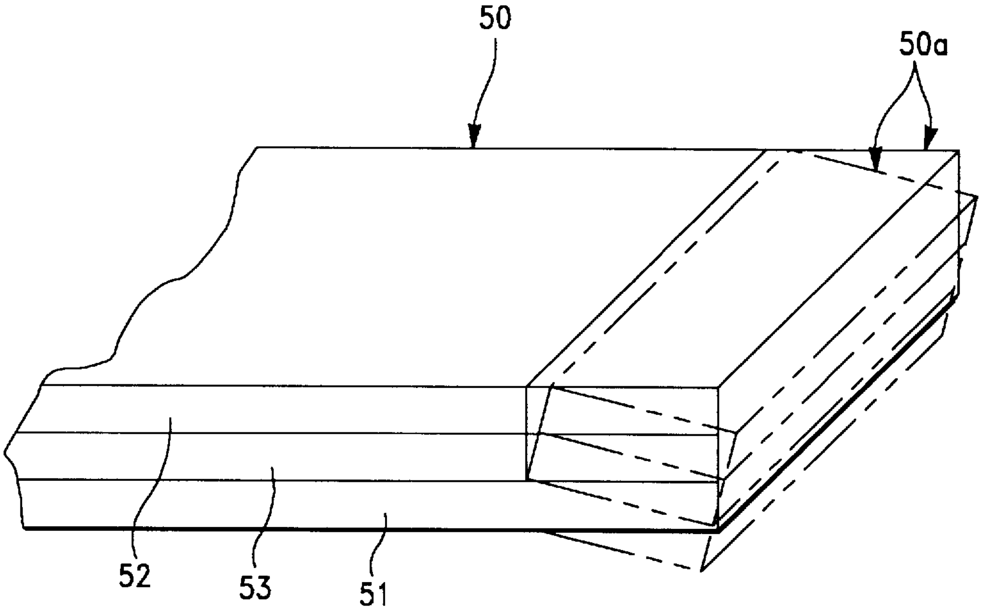
FIG. 13 is a perspective view showing a separation method for adhesive tape of the prior art.

This explanation, which refers to FIGS. 11 and 12, is based on experimental results which show that the dimensions on two sides of the triangle shown in FIG. 3 should be B=5 T–100 T and C=5t–100 T, where T is the thickness of adhesive tape 10. In this experiment, adhesive tape 10 was used in which base material 11*a* was polyethylene terephthalate (PETP), backing paper 12 was regular paper, and the thickness T was 0.15 mm (base material 11*a*: 0.05 mm; adhesive 11*b*: 0.025 mm, backing paper 12: 0.075 mm). Also, the dimensions B=C were set at 2, 3, 4 and 5 mm with the gap A between the support member for adhesive tape 10, i.e., the end of support member 9, and the end of separation member 8 being 0.5 mm (FIG. 11) and 1.0 mm (FIG. 12).

The ease of separation was evaluated according to the number of separation operations until backing paper 12 was completely separated.

As shown in FIG. 11, the results of this experiment show that the number of separation operations was 2 or 3 at B=C=2 mm, 3 to 6 at 3 mm, 5 to 10 at 4 mm, and 6–14 at 5 mm. In FIG. 12, the results were 2 to 4 separation operations at B=C=2 mm, 6 to 9 at 3 mm, 10 to 14 at 4 mm and 10 to 22 at 5 mm. When these results are considered together and the separation forms a handhold for pull off backing paper 12, B=C=3–4 mm in the range A=0.5–1.0 mm; i.e., B=C=20 T–27 T is desirable.

It is desirable that the above conditions for supporting by support members 9,9 be employed for both base tape 11 and backing paper 12. However, a similar effect can be expected if employed for one or the other. Also, if the above conditions are optimized, it is possible to see the effect of each embodiment even if adhesive tape 10 is supported parallel to any edge.

As described above, by means of the invention, the backing paper of adhesive tape can be continuously and efficiently removed in a short time, particularly when the separation operation is performed by rotation, without permanently deforming the adhesive-backed adhesive tape, without damaging the appearance, and without the adhesive tape gradually separating from the object to which it has been affixed due to deformation in the separation operation. Moreover, no unnecessary vibration is generated.

Further, since the method and structure of this invention are simple, there are few factors that can deviate, reliability is high and it can be implemented at low cost. Additionally, this method and structure can be easily implemented in a manual configuration as well as an automatic configuration.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A separation method for an adhesive tape, the adhesive tape including a base tape and a backing sheet laminated on the base tape, the base tape including a base sheet and an adhesive sheet which is sandwiched between the base sheet and the backing sheet, the separation method separating the backing sheet from the base tape, the method comprising the steps of:

supporting one end of the adhesive tape and leaving that end as a free end;

bending the free end with a separation means in a direction from a first surface of the adhesive tape to a second surface of the adhesive tape until slippage occurs between the adhesive sheet and the backing sheet, wherein the first surface of the adhesive tape is on the outside of the bend and the second surface of the adhesive tape is on the inside of the bend, wherein the step of bending is repeated a plurality of times; and when the slippage occurs between the adhesive sheet and the backing sheet, withdrawing the separation means from the adhesive tape as the separation means traces the end surface at the free end;

wherein the free end of the adhesive tape is a corner of the adhesive tape.

2. A separation method for an adhesive tape, the adhesive tape including a base tape and a backing sheet laminated on the base tape, the base tape including a base sheet and an adhesive sheet which is sandwiched between the base sheet and the backing sheet, the base tape and the backing sheet having different friction coefficients on their end surfaces, the separation method separating the backing sheet from the base tape, the method comprising the steps of:

supporting one end of the adhesive tape and leaving that end as a free end; and rubbing against the end surface of the free end with a separation means in a direction from one of the base and backing sheets with a lower friction coefficient toward one of the base and the backing sheets with a higher friction coefficient, wherein the step of rubbing is repeated a plurality of times.

3. The method of claim 2 wherein the period of repeating the step of rubbing is longer than one-half the period of the characteristic vibration frequency of the free end of the adhesive tape.

4. The method of claim 2 wherein the free end of the adhesive tape is a corner of the adhesive tape.

5. The method of claim 2 wherein the free end of the adhesive tape has a thickness of T and a protruding length of 5 T to 100 T.

6. A separation device for an adhesive tape the adhesive tape including a base tape and a backing sheet laminated on the base tape, the base tape including a base sheet and an adhesive sheet which is sandwiched between the base sheet and the backing sheet, the separation device separating the backing sheet from the base tape, the device comprising:

support means for supporting one end of the adhesive tape and leaving that end as a free end; and separation means for bending the free end repeatedly a plurality of times in a direction from a first surface of the adhesive tape to a second surface of the adhesive tape until slippage occurs between the adhesive sheet and the backing sheet, wherein the first surface of the adhesive tape is on the outside of the bend and the second surface of the adhesive tape is on the inside of the bend, when the slippage occurs between the adhesive sheet and the backing sheet, the separation means withdrawing from the adhesive tape as it traces the end surface at the free end;

the separation means including a separation member that comes in contact with the free end of the adhesive tape to bend the free end, and actuating means for causing the separation member to bend the free end;

wherein the actuating means linearly moves the separation member to cause the separation member to bend the free end.

7. The device of claim 6 wherein the separation member includes a plurality of protrusions on its surface, each of which bends the free end as the separation member moves linearly.

8. A separation device for an adhesive tape, the adhesive tape including a base tape and a backing sheet laminated on the base tape, the base tape including a base sheet and an adhesive sheet which is sandwiched between the base sheet and the backing sheet, the base tape and the backing sheet having different friction coefficients on their end surfaces, the separation device separating the backing sheet from the base tape, the device comprising:

support means for supporting one end of the adhesive tape and leaving that end as a free end; and separation means for rubbing against the end surface of the free end repeatedly a plurality of times in a direction from one of the base and backing sheets with a lower friction coefficient toward one of the base and the backing sheets with a higher friction coefficient.

9. The device of claim 8 wherein the separation means includes:

a separation member that comes in contact with the free end of the adhesive tape to rub the free end, and actuating means for causing the separation member to bend the free end.

10. The device of claim 9 wherein the actuating means rotates the separation member to cause the separation member to rub the free end.

11. The device of claim 9 wherein the separation member includes a plurality of protrusions around its circumference, each of which bends the free end as the separation member rotates.

12. The device of claim 9 wherein the actuating means cause the separation member to bend the free end repeatedly a plurality of times and the separation means further includes a controller for adjusting, via the actuating means, the number of times the separation member bends the free end.

13. The device of claim 12 wherein the period of repeated bending the free end by the separation member is longer than one-half the period of the characteristic vibration frequency of the free end of the adhesive tape.

14. The device of claim 8 wherein the free end of the adhesive tape has a thickness of T and a protruding length of 5 T to 100 T.

* * * * *